United States Patent
Yuksel

(10) Patent No.: US 8,655,883 B1
(45) Date of Patent: Feb. 18, 2014

(54) AUTOMATIC DETECTION OF SIMILAR BUSINESS UPDATES BY USING SIMILARITY TO PAST REJECTED UPDATES

(75) Inventor: Baris Yuksel, New York, NY (US)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 13/246,383

(22) Filed: Sep. 27, 2011

(51) Int. Cl.
*G06F 7/00* (2006.01)
*G06F 17/30* (2006.01)

(52) U.S. Cl.
USPC ......................................... 707/737; 707/735

(58) Field of Classification Search
USPC .............................. 707/735, 999.2
See application file for complete search history.

(56) References Cited

U.S. PATENT DOCUMENTS

| | | | | |
|---|---|---|---|---|
| 5,933,818 | A * | 8/1999 | Kasravi et al. ................... | 706/12 |
| 6,578,056 | B1 * | 6/2003 | Lamburt ....................... | 715/205 |
| 7,912,816 | B2 * | 3/2011 | Guha et al. .................... | 707/661 |
| 2006/0069667 | A1 * | 3/2006 | Manasse et al. ....... | 707/999.002 |
| 2006/0184500 | A1 * | 8/2006 | Najork et al. .......... | 707/999.001 |
| 2006/0253580 | A1 * | 11/2006 | Dixon et al. ................... | 709/225 |
| 2008/0086493 | A1 * | 4/2008 | Zhu ......................... | 707/999.101 |
| 2008/0222726 | A1 * | 9/2008 | Chayes et al. .................. | 726/23 |
| 2008/0270376 | A1 * | 10/2008 | Svore et al. ............ | 707/999.005 |
| 2010/0306249 | A1 * | 12/2010 | Hill et al. ....................... | 707/769 |
| 2011/0314122 | A1 * | 12/2011 | Shyamkumar et al. ........ | 709/217 |

FOREIGN PATENT DOCUMENTS

WO    WO 2006042480 A2 *   4/2006    ........... G06Q 10/107

OTHER PUBLICATIONS

Mishra et al., "KhojYantra: An Integrated MetaSearch Engine with Classification, Clustering and Ranking," IEEE, 2000. Retrieved on Jul. 3, 2013 from http://130.203.133.150/viewdoc/download;jsessionid=E6B0A476B3B1425DBD853F85E3F6F21D?doi=10.1.1.10.7212&rep=rep1&type=pdf.*

* cited by examiner

*Primary Examiner* — Charles Lu
(74) *Attorney, Agent, or Firm* — Lerner, David, Littenberg, Krumholz & Mentlik, LLP

(57) ABSTRACT

A system and method are provided that detect spam business listing data. In one aspect, a plurality of clusters containing previously captured spam business data is formed. The attributes of new incoming business data may be compared to the attributes of the clustered spam business data. If the incoming business data is associated with any one of the plurality of clusters, the incoming business data may be deemed spam.

21 Claims, 6 Drawing Sheets

US 8,655,883 B1

AUTOMATIC DETECTION OF SIMILAR BUSINESS UPDATES BY USING SIMILARITY TO PAST REJECTED UPDATES

FIELD OF INVENTION

The present invention relates generally to spam detection. More particularly, aspects of the invention relate to detecting spam business listings by comparing new submissions of business data to clusters of previously captured spam business data.

BACKGROUND OF THE INVENTION

Search entities attempt to provide business information to users by displaying business locations on an electronic map. That is, to other individuals or businesses searching for a particular geographic area.

In the past, systems have selected and displayed business listings based on information received from users. Electronic maps may use overlays to target users interested in a particular destination. For example, search entities may display business listings for users viewing an online electronic map of an area in which the business is located or the business' product is available. Thus, an owner of a pizzeria may have a business listing overlaid upon a map centered within some distance of their location. In that regard, businesses are able to reserve their address on a map to have their information displayed to users searching a destination near their location.

While such systems have been widely used, spam business listing data is frequently submitted by spammers attempting to attract attention to their business listing. For example, a spammer may provide a business address that corresponds to an address of a famous landmark or point of interest (e.g., Empire State Building, Golden Gate Bridge, etc.) Spammers may also send multiple false addresses to maximize their exposure across a variety of locations. In another example, a spammer may provide various false business descriptions to increase the likelihood of being recognized by a search entity.

BRIEF SUMMARY OF THE INVENTION

Aspects of the invention provide systems and methods that identify spam business listing data by comparing business listings to clusters of spam business listing data.

One aspect of the invention provides a method for detecting spam business listing data. The method may implement a processor for receiving new business data, comparing the new business data to one or more stored data clusters that are representative of spam data, determining whether the new business data is associated with the one or more stored data clusters, and if it is determined that the new business data is associated with the one or more stored data clusters, classifying the new business data as spam business data. Determining whether the new business data is associated with the one or more stored data clusters may comprise generating a cluster point record at least partially based on the new business data, plotting the cluster point record at a position on a plane having a number of dimensions, the number of dimensions corresponding to a number of fields included in the cluster point record, and determining if information stored in the cluster point record is similar to information contained in the one or more stored data clusters. Information stored in the cluster point record may be similar to information contained in the one or more stored data clusters when a distance between the position and a position of a centroid of the one or more stored data clusters falls below a predetermined threshold.

Another aspect of the technology provides a processing system for detecting spam business listing data. The system may comprise memory storing spam data clusters representative of previously identified spam data and a processor. The processor may be configured to receive new business data, compare the new business data to one or more stored data clusters, determine whether the new business data is associated with the one or more stored data clusters, and if it is determined that the new business data is associated with the one or more stored data clusters, classify the new business data as spam business data. The processor may further be configured to obtain a plurality of spam business records, and store each of the plurality of spam business records in the one or more of the stored data clusters. Storing the spam business records may comprise generating a cluster point record at least partially based on a given spam business record, and plotting the cluster point record at a position on a plane having a number of dimensions such that information contained in the cluster point record is similar to information contained in the one or more stored data clusters, the number of dimensions corresponding to a number of fields included in the cluster point record.

Yet another aspect of the invention provides a computer-readable medium having stored thereon computer-executable instructions for configuring a processor to perform a method. The method may comprise receiving new business data, comparing the new business data to one or more stored data clusters that are representative of spam data, determining whether the new business data is associated with the one or more stored data clusters, and if it is determined that the new business data is associated with the one or more stored data clusters, classifying the new business data as spam business data.

DETAILED DESCRIPTION

Systems and methods according to one aspect of the invention involve forming a plurality of clusters containing previously captured spam business data. The attributes of new incoming business data may be compared to the attributes of the clustered spam business data. If the incoming business data is associated with any one of the plurality of clusters, the incoming business data may be deemed spam and flagged for further manual inspection.

Figure 1:
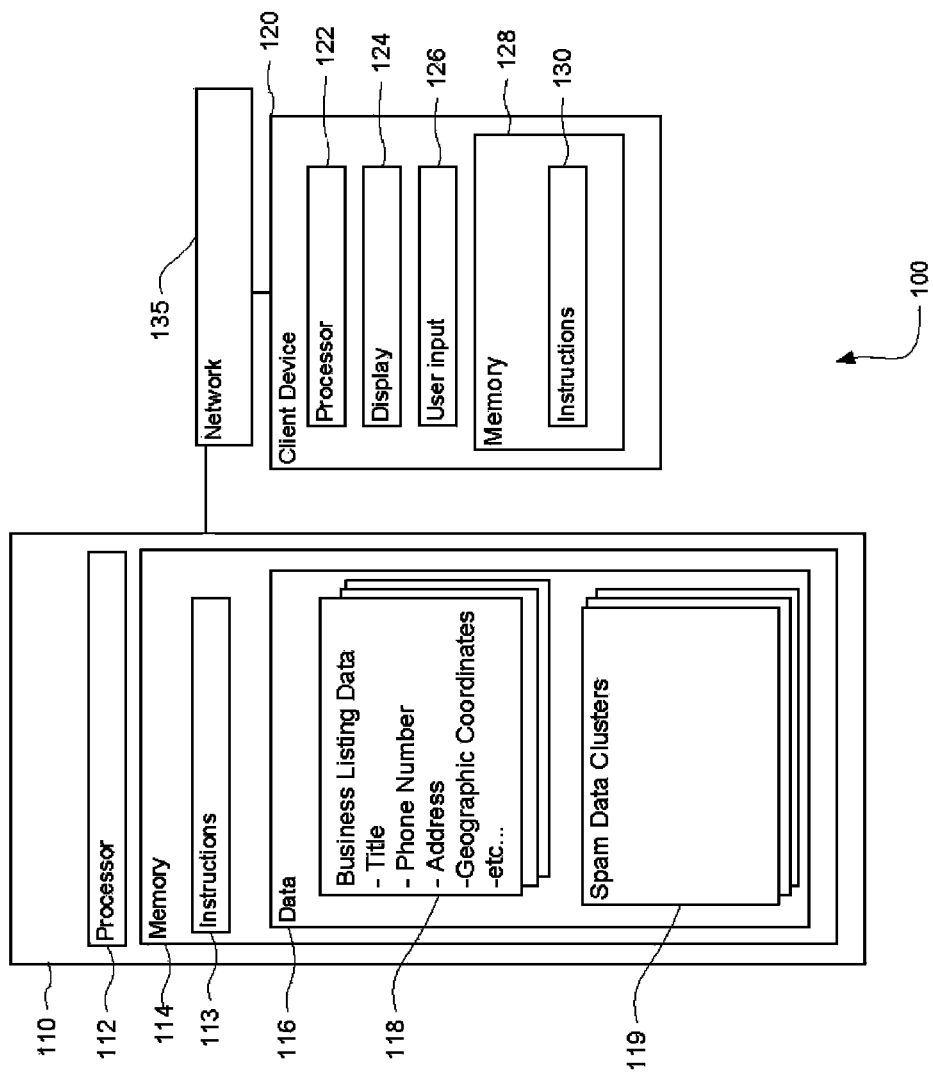
FIG. 1 is a functional diagram of a system in accordance with an aspect of the invention.
Figure 2:
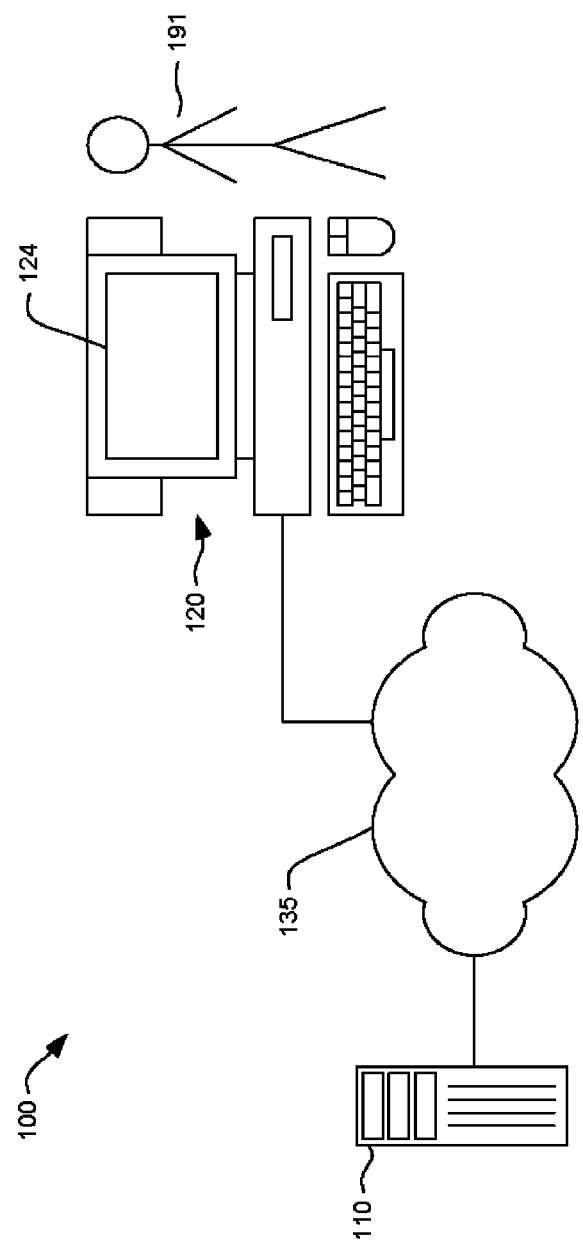
FIG. 2 is a pictorial diagram of the system of FIG. 1.

As shown in FIGS. 1-2, a system 100 in accordance with one aspect of the invention may include a computer, such as a server, 110 in communication with a client device 120 over a network 135. Client device 120 may transmit business data to computer 110. In turn, computer 110 may write the transmitted business data to business listing database 118. It is understood that the system of FIGS. 1-2 is merely illustrative and that other arrangements may be employed. For example, a user or automated process may directly update business listing database 118 without transmitting the data over network 135 from a client device 120.

Computer 110 may contain a processor 112, instructions 113, memory 114 and other components typically present in general purpose computers. FIGS. 1-2 also illustrate a client device 120 containing a processor 122, a display device 124, a user input 126, instructions 130, and a memory 128.

Memories 128 and 114 may store information accessible by their respective processors, including instructions 113 and 130, which may contain instructions executable by the processors. The memories 128 and 114 may be of any type capable of storing information, including a tangible computer-readable storage medium such as a hard-drive, memory card, ROM, RAM, DVD, CD-ROM or other optical disks, as well as other write-capable, and read-only memories. Memory 114 of computer 110 may include data 116 that may be retrieved, manipulated or stored by processor 112. The processors 112 and 122 may be any well-known processors, such as processors from Intel Corporation or AMD. Alternatively, the processors may be dedicated controllers such as an ASIC.

The instructions 113 and 130 may include any set of instructions to be executed directly (such as machine code) or indirectly (such as scripts) by processors 112 and 122 respectively. The instructions may be stored as computer code on a computer-readable medium. In that regard, the terms "instructions," "steps" and "programs" may be used interchangeably herein. The instructions may be saved in object code format for direct processing by the processor, or in any other computer language including scripts or collections of independent source code modules that are interpreted on demand or compiled in advance. Functions, methods and routines of the instructions are explained in more detail below.

Although FIG. 1 functionally illustrates the processors and memories as being within the same respective blocks, it will be understood that the processors and memories may actually comprise multiple processors and memories that may or may not be stored within the same physical housing. For example, some of the instructions and data may be stored on a removable CD-ROM and others within a read-only computer chip. Some or all of the instructions 113 and 130 may be stored in a location physically remote from, yet still accessible by either processor. Accordingly, references to a processor or computer will be understood to include references to a collection of processors or computers that may or may not operate in parallel.

Client device 120 may be a personal computer, intended for use by a person 191, having all the internal components normally found in a personal computer such as a central processing unit (processor 122), display device 124 (for example, a monitor having a screen, a projector, a touch-screen, a small LCD screen, a television, or another device such as an electrical device that is operable to display information processed by the processor), a computer-readable medium (for example, a CD-ROM, hard-drive, RAM or ROM), such as memory 128, user input 126 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, laptops, and network computers lacking local storage capability.

Although the client device 120 may comprise a full-sized personal computer, the systems and methods may also be used in connection with devices capable of wirelessly exchanging data with a server over a network such as the Internet. For example, client device 120 may be a wireless-enabled PDA such as a Blackberry phone, an Internet-capable cellular phone, a notebook, or a tablet PC. The user may input information using a small keyboard, a keypad, a touch screen, or any other means of user input.

Computer 110 and client device 120 are capable of direct and indirect communication, such as over a network 135. Although only two computers are depicted in FIGS. 1-2, it should be appreciated that a system may include a large number of connected computers, with each different computer being at a different node of the network 135. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Although the systems and methods are not limited by any particular data structure, the data 116 may be stored in computer registers, in a relational database as a table having a plurality of different fields and records, XML documents, etc. Moreover, the data may comprise any information sufficient to identify the relevant information, such as numbers, descriptive text, proprietary codes, pointers, references to data stored in other memories (including other network locations) or information that is used by a function to calculate the relevant data.

The computer 110 may also contain business listings database 118 identifying local businesses, clubs, or other entities, objects, or features associated with particular geographic locations. For example, an entity may be associated with a name (such as a company's name), a category (such as "pizza," "Italian restaurant" or "ballpark"), a geographic location (such as "123 Main Street" or latitude and longitude), and various other types of information.

Entities may also refer to other geographically located objects in addition to or instead of businesses. For example, entities may include points of interest, individual's homes, landmarks, roads, etc. Therefore, while many of the examples below refer to businesses, most aspects of the invention are not limited to any particular type of entity unless stated otherwise.

Entity information may be compiled by automatically gathering information from multiple online directories, aggregators, telephone directories or other content sources. Alternatively, the entity information may be manually entered by a user.

The computer 110 may also contain spam clusters database 119 containing data arranged as a plurality of clusters. Each cluster may include a subset of business data that have been previously identified as spam. Spam business data belonging to a given cluster may have certain properties in common such that the data is "similar" to each other in some way. For example, spam business data belonging to one cluster may all have the same phone number. Another cluster may contain spam business data originating from the same internet protocol ("IP") address. In a further example, a third cluster may contain spam business data having the same geographic coordinates. It is understood that the spam business data in each cluster may have any attribute type in common.

The clusters contained in spam clusters database 119 may be arranged using any known cluster analyzes algorithm. In one example, the clusters are generated and maintained using the k-means clustering algorithm. In accordance with the k-means algorithm, the spam business data may be partitioned into a pre-defined number of clusters. Initially, cluster centers or centroids may be randomly selected. Preferably, the initial cluster centers are positioned as far as possible from each other. Each spam business record is assigned to a cluster based on the similarity of each spam record to the cluster. The similarity to a cluster is determined when the distance between the cluster's centroid and the position of coordinates assigned to the spam business record is the least among the distances to all centroids. The distance may be calculated using any known distance algorithms, such as the Euclidean distance algorithm. After assigning a spam business record to a cluster, the centroid of each cluster is recalculated. The aforementioned process is repeated until all spam business records are assigned to a cluster. One illustrative manner of assigning coordinates to a record is discussed further below.

Figure 3:
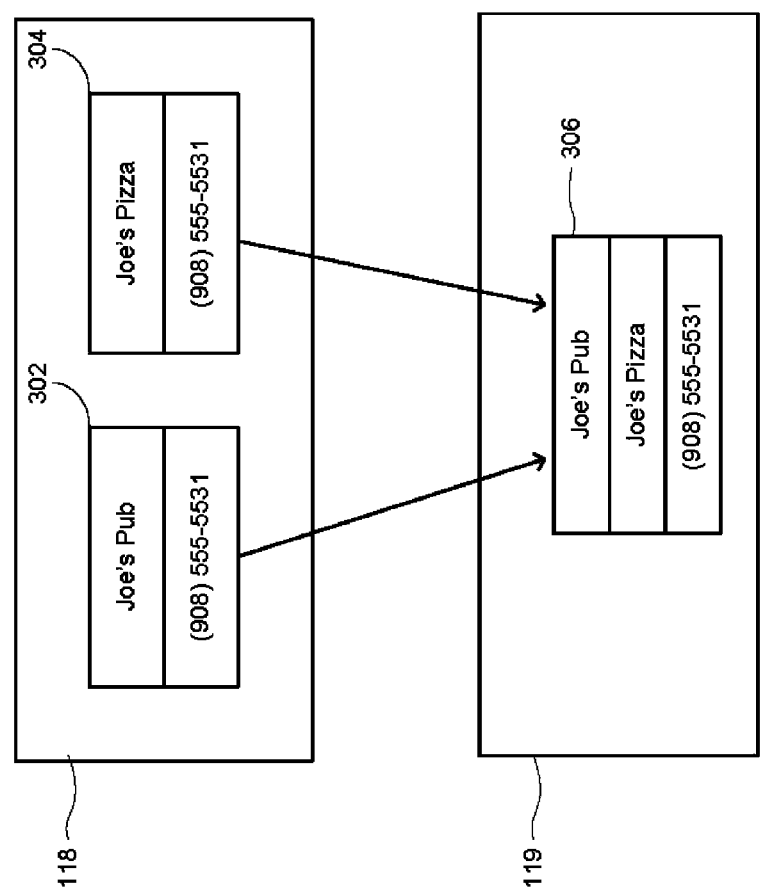
FIG. 3 is an illustrative data model in accordance with an aspect of the invention.
Figure 4:
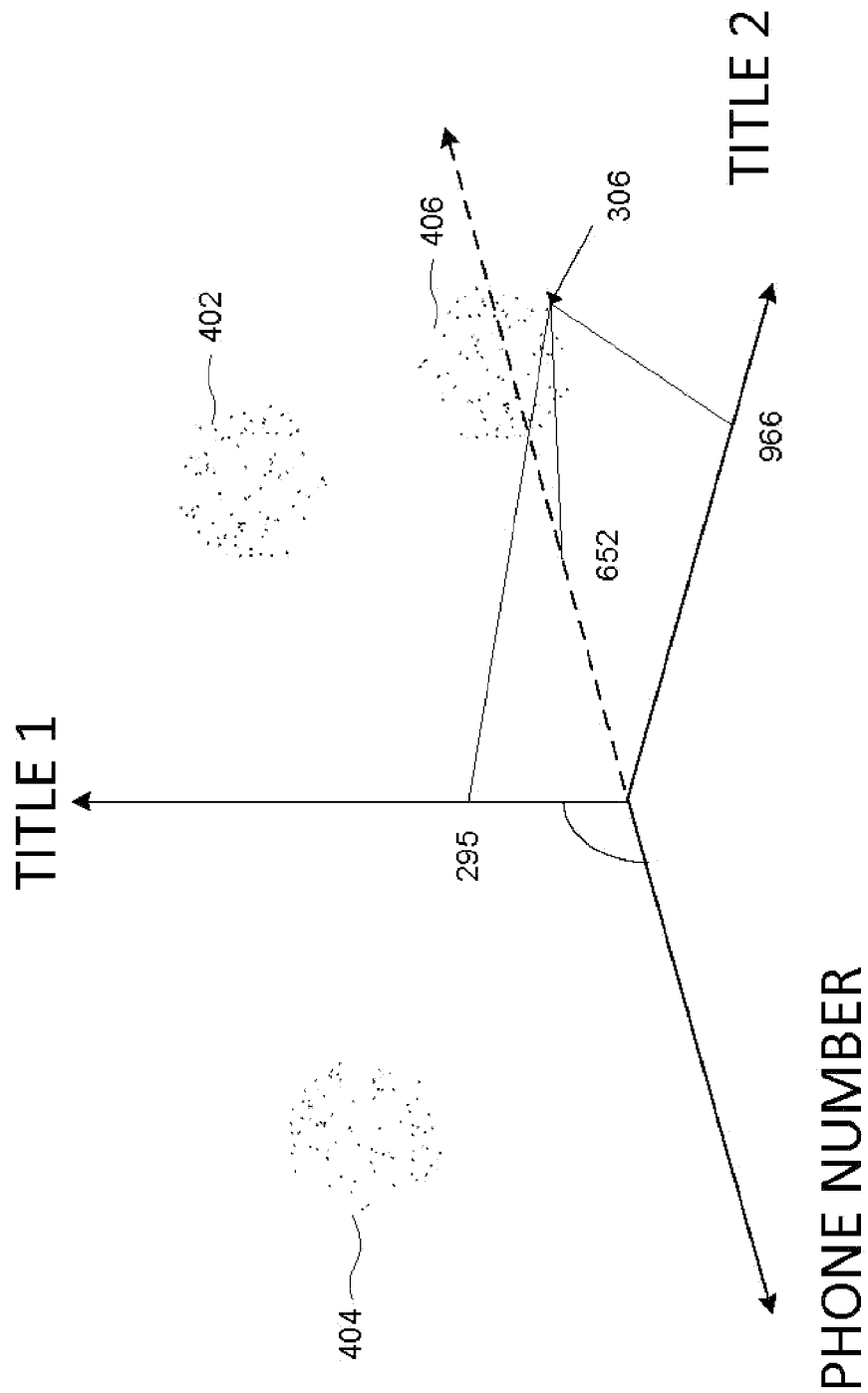
FIG. 4 is a graphical representation of an illustrative data model in accordance with an aspect of the invention.

FIGS. 3-4 illustrate a working example of spam business records being assigned to a cluster. In particular, FIG. 3 illustrates data that may be stored within spam data clusters database 119. FIG. 4 is a graphical representation of a three dimensional space in accordance with aspects of the present application.

Referring to FIG. 3, spam record 302 is shown having a title field with a value of "Joe's Pub" and a phone number field having a value of "(908) 555-5531," and an address field of "25 Main Street." FIG. 3 also shows spam record 304 having a title field with a value of "Joe's Pizza," a phone number field also having a value of "(908) 555-5531," and an address field of "25 Main St." The system and method may assign spam records 302 and 304 to cluster 406 because of their similarity to cluster 406. As noted above, one example of similarity is the distance between the coordinates assigned to a record and the center of the cluster. Spam records 302 and 304 may form two points in a three dimensional space. The system and method may allocate additional cluster points that are similar to spam records 302 and 304. These points may eventually form a larger cluster of spam data having similar attributes. As noted above, other clusters may be formed having other common attributes (e.g., originating IP address, title, geospatial coordinates, etc.)

Each spam record may become a cluster point generated by the system and plotted in an N dimensional graph. The number of dimensions may equal the number of fields included in each cluster point. For example, spam record 304 may be plotted in a three dimensional graph in accordance with a unique coordinate assigned to each field of spam record 304. The coordinates may be assigned to each field in a variety of ways. In one embodiment, the string "Joe's Pizza" may be assigned a value 966, which is simply the sum of ASCII values for each character in the string. The sum of ASCII values of the characters in the string "(908)555-5531" is 652, and the sum of ASCII values of the characters in "25 Main St." is 801. The values 966, 652, and 801 may each represent a coordinate in a three dimensional graph.

Referring to FIG. 4, clusters 402, 404, and 406 may be bound by a common attribute (e.g., phone number, title, address etc.). Clusters 402, 404, and 406 each have a center 408, 410, and 412 respectively. Spam record 304 is shown as a cluster point belonging to cluster 406 with a TITLE coordinate of 966, a PHONE NUMBER coordinate of 652, and an ADDRESS coordinate of 801. These coordinates are nearest to the center 412 of cluster 406. As will be discussed below, these clusters may be used to determine whether incoming business data updates are spam.

Figure 5:
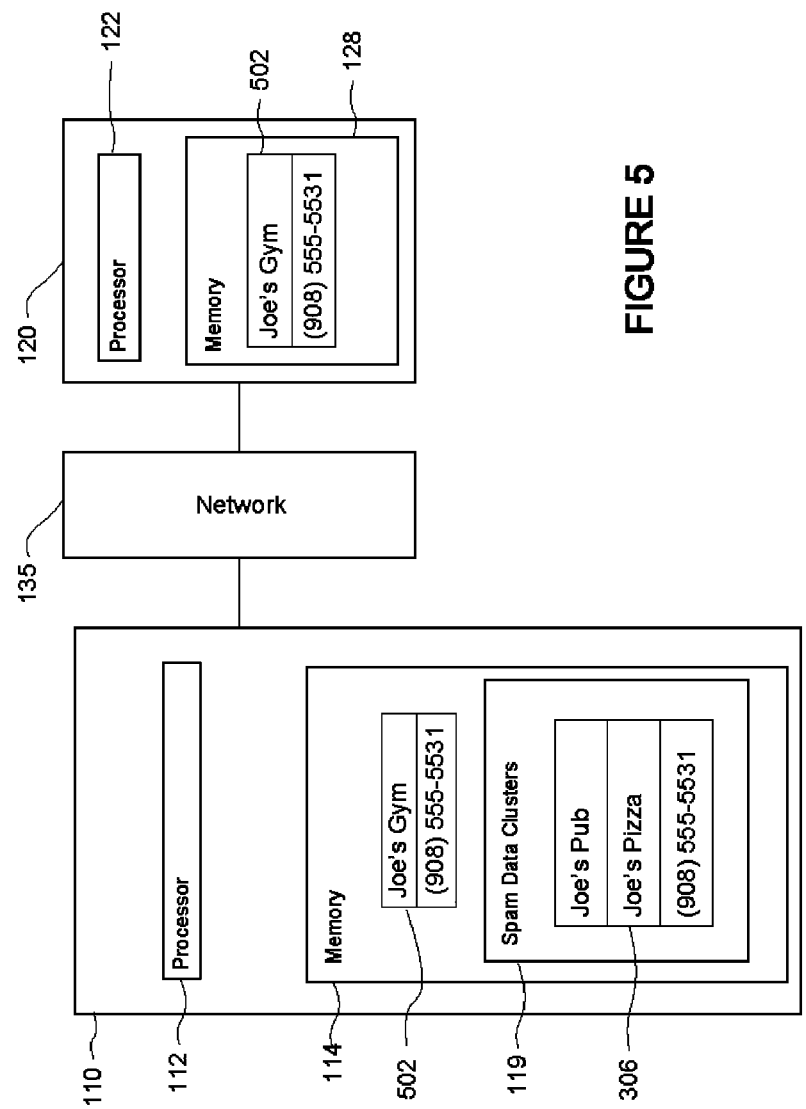
FIG. 5 is a functional diagram of data in accordance with an aspect of the invention.

FIG. 5 illustrates data that may be stored within the memory of both computer 110 and client device 120 after the client device 120 transmits a new business record 502 to computer 110. Upon transmission of new business record 502 to computer 110, the system and method may compare new business record 502 to various clusters stored in spam clusters database 119. In one embodiment, the new business record may be assigned coordinates in an N dimensional space and appointed to a cluster whose centroid is nearest to the assigned coordinates. New business record 502 is shown having a title field with a value of "Joe's Gym," a phone number field with a value of "(908) 555-5531," and an address field with a value of "25 Main Ave."

Figure 6:
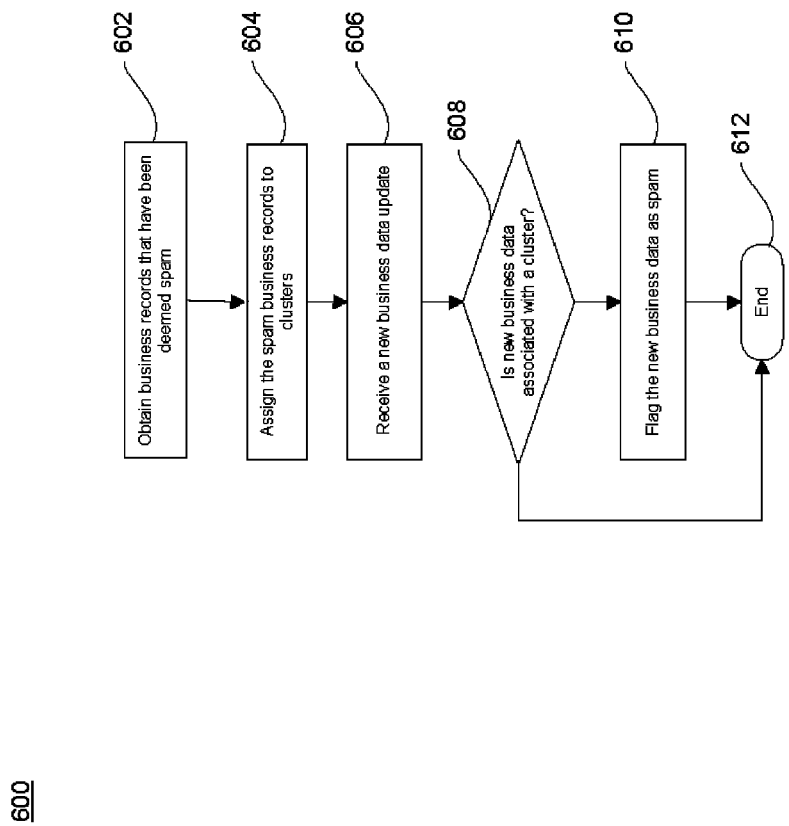
FIG. 6 is a flowchart in accordance with an aspect of the invention.

FIG. 6 is a graphical illustration of new business record 502 being plotted in a three dimensional graph. As with the former spam business records illustrated above, a coordinate value may be assigned to each field of business record 502. Assuming the ASCII values of the characters of each field are added, the coordinates assigned to the title field, the phone number field, and the address field of new business record 502 would be 773, 652, and 840 respectively. In FIG. 6, business record 502 is shown as a cluster point nearest to center 412 of cluster 406. Thus, business record 502 may be assigned to cluster 406 and flagged for further inspection or discarded.

It should be understood that the sample values, types and configurations of data shown in the foregoing figures are for the purposes of illustration only. In that regard, systems and methods in accordance with aspects of the invention may include different data values, types and configurations, and may be provided and received at different times and by different entities (e.g., some values may be pre-suggested or provided from different sources).

In addition to the operations illustrated in the foregoing figures, a method of detecting spam business records in accordance with aspects of the invention will now be described. It should be understood that the steps of the following method do not have to be performed in the precise order described below. Rather, various steps can be handled in reverse order or simultaneously, and steps may be added or omitted.

FIG. 7 illustrates a method 600 that may be executed by processor 112 in accordance with the instructions 113. In block 602, the system and method may obtain a plurality of business records that have been deemed spam. These records may be stored in business listing database 118 and flagged as spam by another process or manually by an administrator.

In block 604, the system and method may assign each spam business record to a point in space in accordance with a known clustering algorithm. As noted above, the k-means algorithm may be utilized to initialize the clusters such that each spam business record is assigned to the cluster whose center is closest to the coordinates assigned to each spam business record. In block 606, new business data may be received from a remote computer or directly through a user input of computer 110. In block 608, the system and method may determine whether the new business data is associated with any one of the previously formed clusters. As illustrated above, the new business data may be assigned unique coordinates in an N dimensional space. The distances to the centroids of the clusters that were generated in block 604 may be determined. If the distance to a centroid of one or more clusters fall below a predetermined threshold, the new business data may be associated with the one or more clusters.

The threshold may be determined in any number of ways. According to a one example, a histogram of all distances between all spam labeled data points may be drawn, and a threshold may be manually determined by inspection. This threshold may be tested by taking a sample (e.g., N=1000) of all new business updates that would be categorized as spam under this threshold, and finding the percentage of those updates that are actually spam. Similar tests may be performed on lower thresholds, until a threshold resulting in the most accurate categorization of spam is determined.

If it is determined that the new business data is associated with a cluster, the system and method may flag the new business data as spam, as shown in block 610. Otherwise, the system and method may end in block 612.

At least one advantage of the above-described system and method is the ability to prevent spam business data from entering a system relied on by other users and systems. In this regard, other systems that search and display business listings, such as search entities or electronic maps, may provide accurate listing information.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

The invention claimed is:

1. A method for detecting spam business listing data, the method comprising:
    receiving, using a processor, new business data;
    comparing, using the processor, the new business data to a plurality of stored data clusters, each stored data cluster including a plurality of spam data records having an attribute in common, wherein different ones of the plurality of stored data clusters have different common attributes;
    determining, using the processor, whether the new business data is associated with one of the plurality of stored data clusters, the determining comprising:
        generating a cluster point record at least partially based on the new business data, the cluster point record including a plurality of fields; and
        representing the cluster point record on a plane having a number of dimensions, the number of dimensions corresponding to the number of fields included in the cluster point record; and
    if it is determined that the new business data is associated with one of the plurality of stored data clusters, classifying, using the processor, the new business data as spam business data.

2. The method of claim 1, wherein determining whether the new business data is associated with one of the plurality of stored data clusters further comprises:
    plotting the cluster point record, based on unique coordinates assigned to each field of the cluster point record, at a position on the plane having the number of dimensions corresponding to the number of fields included in the cluster point record; and
    determining if information stored in the cluster point record is similar to information contained in one of the plurality of stored data clusters.

3. The method of claim 2, wherein information stored in the cluster point record is similar to information contained in the plurality of stored data clusters when a distance between the position and a position of a centroid of one of the plurality of stored data clusters falls below a predetermined threshold.

4. The method of claim 1, wherein the at least one attribute is a data field value.

5. The method of claim 4, wherein the data field value is a value stored in a field contained in each of the plurality of records.

6. The method of claim 1, wherein the at least one attribute is an originating internet protocol address, the originating internet protocol address representative of a source of spam business records.

7. The method of claim 1, further comprising obtaining, using the processor, a plurality of spam business records.

8. The method of claim 7, further comprising storing each of the plurality of spam business records in one of the plurality of stored data clusters.

9. The method of claim 8, wherein storing each of the plurality of spam business records comprises:
    generating a cluster point record at least partially based on a given spam business record; and
    plotting the cluster point record at a position on a plane having a number of dimensions such that information contained in the cluster point record is similar to information contained in one of the plurality of stored data clusters, the number of dimensions corresponding to a number of fields included in the cluster point record.

10. The method of claim 9, wherein the cluster point record is similar to information contained in the one of the plurality of stored data clusters when a distance between the position and a centroid of the one of the plurality of stored data clusters falls below a predetermined threshold.

11. A processing system for detecting spam business listing data, the system comprising:
    memory storing spam data clusters representative of previously identified spam data;
    a processor to:
        receive new business data;
        compare the new business data to a plurality of stored data clusters, each stored data cluster including a plurality of spam data records having an attribute in common, wherein different ones of the plurality of stored data clusters have different common attributes;
        determine whether the new business data is associated with one of the plurality of stored data clusters, the determining comprising:
            generating a cluster point record at least partially based on the new business data, the cluster point record including a plurality of fields; and
            representing the cluster point record on a plane having a number of dimensions, the number of dimensions corresponding to the number of fields included in the cluster point record; and
        if it is determined that the new business data is associated with one of the plurality of stored data clusters, classify the new business data as spam business data.

12. The processing system of claim 11, wherein determining whether the new business data is associated with one of the plurality of stored data clusters further comprises:
   plotting the cluster point record, based on unique coordinates assigned to each field of the cluster point record, at a position on the plane having the number of dimensions corresponding to the number of fields included in the cluster point record; and
   determining if information stored in the cluster point record is similar to information contained in the one of the plurality of stored data clusters.

13. The processing system of claim 12, wherein information stored in the cluster point record is similar to information contained in one of the plurality of stored data clusters when a distance between the position and a centroid of the one of the plurality of stored data clusters falls below a predetermined threshold.

14. The processing system of claim 11, wherein the at least one attribute is a data field value.

15. The processing system of claim 14, wherein the data field value is a value stored in a field contained in each of the plurality of records.

16. The processing system of claim 11, wherein the at least one attribute is an originating internet protocol address, the originating internet protocol address representative of a source of spam business records.

17. The processing system of claim 11, wherein the processor further obtains a plurality of spam business records.

18. The processing system of claim 17, wherein the processor further stores each of the plurality of spam business records in the plurality of stored data clusters.

19. The processing system of claim 18, wherein storing each of the plurality of spam business records comprises:
   generating a cluster point record at least partially based on a given spam business record; and
   plotting the cluster point record at a position on a plane having a number of dimensions such that information contained in the cluster point record is similar to information contained in one of the plurality of stored data clusters, the number of dimensions corresponding to a number of fields included in the cluster point record.

20. The system of claim 19, wherein the cluster point record is similar to information contained in one of the plurality of stored data clusters when a distance between the position and a centroid of the one of the plurality of stored data clusters falls below a predetermined threshold.

21. A non-transitory computer-readable medium having stored thereon computer-executable instructions for configuring a processor to perform a method, said method comprising:
   receiving new business data;
   comparing the new business data to a plurality of stored data clusters, each stored data cluster including a plurality of spam data records having an attribute in common, wherein different ones of the plurality of stored data clusters have different common attributes;
   determining whether the new business data is associated with one of the plurality of one of the plurality of stored data clusters, the determining comprising:
   generating a cluster point record at least partially based on the new business data, the cluster point record including a plurality of fields; and
   representing the cluster point record on a plane having a number of dimensions, the number of dimensions corresponding to the number of fields included in the cluster point record; and
   if it is determined that the new business data is associated with one of the plurality of stored data clusters, classifying the new business data as spam business data.

* * * * *